UNITED STATES PATENT OFFICE.

ERIK LUDVIG RINMAN, OF HARNÄS, SWEDEN.

PROCESS OF TREATING WASTE LIQUORS FROM SODA-PULP MILLS.

1,017,320. Specification of Letters Patent. Patented Feb. 13, 1912.

No Drawing. Application filed January 27, 1911. Serial No. 605,095.

*To all whom it may concern:*

Be it known that I, ERIK LUDVIG RINMAN, a subject of the King of Sweden, residing at Harnäs, in the Kingdom of Sweden, have invented new and useful improvements in processes of treating waste liquors from soda-pulp mills in order to regenerate caustic soda and recover organic substances therefrom, of which the following is a specification.

Black liquors from soda pulp mills that have been freed, wholly or to a considerable extent, from those organic substances which are precipitated by carbonic acid, whether the separation of the said substances be performed by treatment with carbonic acid or otherwise, contain besides sodium oxid combined with carbonic acid or acids weaker than carbonic acid, also sodium oxid combined with acetic acid, formic acid, resinous acids and other organic acids.

The object of the invention is to provide a process of regenerating caustic soda and recovering the organic acids contained in the said liquors.

The invention consists, chiefly, in saturating the liquor, after concentrating the same, if required, with carbonic acid at a temperature favorable for the formation of bicarbonate of soda. Such a temperature lies between 15° and 40° centigrade. The output of bicarbonate of soda precipitated is increased as the liquor is concentrated. At all events, the liquor cannot be concentrated more than to the consistency of syrup, since in such case it would not be possible to separate the bicarbonate by filtration. The saturation with carbon dioxid generally requires 10 to 20 hours (more or less according to the concentration of the carbon dioxid). The precipitate of bicarbonate of soda may be employed, after washing or unwashed, for producing boiling-lye. The filtrate remaining after the precipitation of the bicarbonate of soda may thereupon be further treated by adding to it a stronger acid, such as oxalic, hydrochloric, sulfuric, or phosphoric acid, whereby the organic acids are disengaged. As to the latter, the acetic acid and the formic acid may be separated by distillation, being obtainable separately or together, as may be desired. Thus, for instance, the filtrate may first be partially acidified with the stronger acid, the quantity of acid equivalent to half the quantity or somewhat less than half the quantity of soda combined with carbon dioxid and organic acids, in which case the acetic acid is disengaged and may be distilled off, while the stronger formic acid remains in combination with sodium oxid; after distilling off the acetic acid the residue is completely acidified for disengaging the formic acid. The resinous acids, if they have not been separated (by filtration, skimming or otherwise) before or during the distillation of acetic acid and formic acid, remain together with syrupy substances soluble in water and the soda salts of the acid or acids employed. If desired, this residue may be heated to about 200° centigrade, whereby the organic acids give off water and carbonic acid, said heating being continued as long as gas is developed. By this treatment the organic acids are entirely resinized, so that they will become insoluble in water. The mass of salt may thereupon be easily separated from the resins by washing the mass with water, preferably hot, by which it is dissolved while the resins remain undissolved. The residue after distillation may, obviously, be treated with alcohol or other suitable solvent for the organic substances until these substances have been dissolved, whereupon they may be separated from the salts by any suitable methods. As a suitable solvent instead of alcohol small quantities of water, preferably heated, may be employed. The salts which are obtained from the residue after distillation are particularly adapted to be again used in the process since the same do not contain any nocuous matters.

If the stronger acid used for disengaging the organic acids be oxalic acid, it should be added in the form of an aqueous solution, preferably hot. In such case the reaction will be complete, if the substances engaged in the same are calculated from the formula. If the solution contains sufficient quantities of highly dissociated salts, such as sodium chlorid, the sodium oxalate formed in the reaction is completely precipitated, even in warm solution, as a fine crystalline powder, so that the solution of acetic acid, formic acid, etc., which is chemically free from oxalic acid, may be separated from the oxalate without any quantity thereof being lost. If desired, this oxalate may be washed with water, the wash-water being suitably used for dissolving further quantities of oxalic acid. By treating the sodium oxalate with caustic lime soda lye for boiling cellulose matters and calcium oxalate for producing new quantities of oxalic acid may be produced. In causticizing the sodium oxalate the crystal mass thereof may by stirring be converted directly into somewhat more than the calculated quantity of lime-wash of ordinary temperature. If the quantity of oxalate per liter of lime-wash does not exceed 70 gr. of $Na_2O$ a complete reaction with sodium oxalate to form calcium oxalate and soda lye is obtained in a comparatively short time. The lime-wash for causticizing the sodium oxalate is suitably obtained by slaking lime with the water used for washing the precipitate of calcium oxalate.

When the organic acids are liberated by hydrochloric acid, the quantity of which need not be greater than that calculated from the formula, the sodium chlorid thereby formed may advantageously be decomposed according to electrolytical methods, especially if the saliferous soda lye thus obtained can be employed for boiling cellulose substances if the presence of sodium chlorid does not constitute an obstacle. By this means the further advantage is gained that the chlorin and hydrogen obtained are transformable into hydrochloric acid which may be employed for acidifying further quantities of black liquor. The sodium chlorid may also be used for producing carbonate of soda by means of the ammonia-soda process. The procedure is advantageous particularly on account of its not being necessary to free the carbonate of soda obtained from sodium chlorid and on account of it being possible to produce at the same time carbonate of soda from new quantities of sodium chlorid in order to cover completely the loss of carbonate of soda in boiling cellulose substances with such a cheap saliferous solution of carbonate of soda. Moreover, the bicarbonate of soda obtained, which contains ammonia and carbonic acid, need not be calcined but may be freed from ammonia and carbonic acid in solution, which is considerably cheaper. If, on the other hand, sulfuric acid is used for disengaging the organic acids, carbonate of soda may, obviously, be recovered by the Le Blanc process from the sulfate obtained. The solution of carbonate of soda obtained is causticized directly to produce boiling-lye for boiling cellulose substances. Finally, if phosphoric acid is used for disengaging the organic acids, the sodium phosphate obtained may be treated with lime for producing directly soda-lye for boiling cellulose substances and at the same time obtaining calcium phosphate. The phosphoric acid is thereupon regenerated in known manner from the calcium phosphate by means of sulfuric acid.

I claim:

The process of treating black liquors from soda pulp mills, which consists in first freeing the liquor substantially from organic substances capable of being precipitated by carbonic acid, and thereupon precipitating bicarbonate of soda by saturating the liquor with carbonic acid at a suitable concentration and a suitable temperature of the liquor.

ERIK LUDVIG RINMAN.

Witnesses:
HENRY PERSON,
WALENTIN BERGGREN.